United States Patent [19]

Porat et al.

[11] Patent Number: 4,765,728
[45] Date of Patent: Aug. 23, 1988

[54] CONTACT LENS WITH A BACK SURFACE HAVING SECOND-ORDER PORTIONS

[75] Inventors: Menachem Porat; Ofer Rabinovich, both of Kibbutz Hanita, Israel

[73] Assignee: Hanita Lenses, a Limited Partnership, Kibbutz Hanita, Israel

[21] Appl. No.: 838,580

[22] Filed: Mar. 11, 1986

[30] Foreign Application Priority Data

Dec. 18, 1985 [IL] Israel ............................... 77373

[51] Int. Cl.$^4$ ............................................... G02C 7/04
[52] U.S. Cl. .................................. 351/160 R; 351/161
[58] Field of Search ............... 351/160 R, 160 H, 161, 351/162

[56] References Cited

U.S. PATENT DOCUMENTS

| | | | |
|---|---|---|---|
| 3,482,906 | 12/1969 | Volk | 351/160 R |
| 3,950,082 | 4/1976 | Volk | 351/161 X |
| 4,418,991 | 12/1983 | Breger | 351/161 |
| 4,525,043 | 6/1985 | Bronstein | 351/160 |
| 4,640,595 | 2/1987 | Volk | 351/160 R |

Primary Examiner—John K. Corbin
Assistant Examiner—Scott J. Sugarman

[57] ABSTRACT

A contact lens having a back surface comprising a central zone and at least one marginal zone. The central zone and the marginal zone being each constituted by portions of second-order surfaces of revolution other than spherical. The transition from the central to the marginal zone is tangential, and in the marginal zone, the axial clearance between the cornea and the back surface increases in direction towards the edge of the lens.

5 Claims, 3 Drawing Sheets

CONTACT LENS WITH A BACK SURFACE HAVING SECOND-ORDER PORTIONS

The present invention relates to a contact lens.

Successful use of contact lenses depends both on initial and, to an even greater degree, long-term compatibility which, in their turn, are largely functions of the geometry of the cornea-contacting back surface of the lens in relation to the geometry of the cornea itself.

Geometrically speaking, the cornea is not spherical, but a segment of an ellipsoid or, to be precise, of a prolate ellipsoid of revolution, that is, a solid generated by rotating an ellipse about its major axis. This generating ellipse, or generatrix as it is called, has, however, a rather small eccentricity and the cornea thus approximates a spherical segment closely enough for manufactures of contact lenses, until fairly recently, to try and produce contact lenses with spherical back surfaces, having had, as they did, long experience in, as well as being equipped for, generating spherical surfaces to any degree of accuracy and surface quality. Yet because of the deviation from the true geometry of the cornea, these contact lenses suffer from various drawbacks all of which have a deleterious effect on long-term compatibility that is, ultimately, on wearer comfort: pressure distribution on the corneal surface is nonuniform, surface pressure being concentrated mainly at the edges and the very center of the cornea. This may result in mechanical irritation of the cornea, especially of its periphery and, possibly, of the conjunctiva, in the interference with the essential film of tears on which the lens "floats" or with the not less essential oxygen supply to the corneal surface, and with proper heat exchange between the cornea and the ambient air.

With the advent of computer-controlled machining which facilitated the relatively simple generation also of nonspherical surfaces, an attempt was made to produce contact lenses with an ellipsoidal back surface that was the exact negative of the corneal shape. While these lenses were a distinct improvement upon the spherical ones, they still failed to completely, or even substantially, remedy the above-mentioned difficulties.

It is one of the objects of the present invention to overcome the disadvantages and drawbacks of the prior-art contact lenses, and to provide a contact lens of an optimum back-surface geometry (which, as extended tests have shown is not necessarily the perfect negative of the corneal geometry) that will produce uniform pressure distribution, preserve the lacrimal film, enhance thermal and metabolic exchange, and altogether increase initial as well as long-term compatibility.

This the invention achieves by providing a contact lens having a back surface comprising a central zone and at least one marginal zone, said central zone and said marginal zone being each constituted by portions of second-order surfaces of revolution other than spherical, wherein the transition from said central to said marginal zone is tangential, and wherein in said marginal zone, the axial clearance between the cornea and the back surface increases in direction towards the edge of said lens.

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Figure 1:
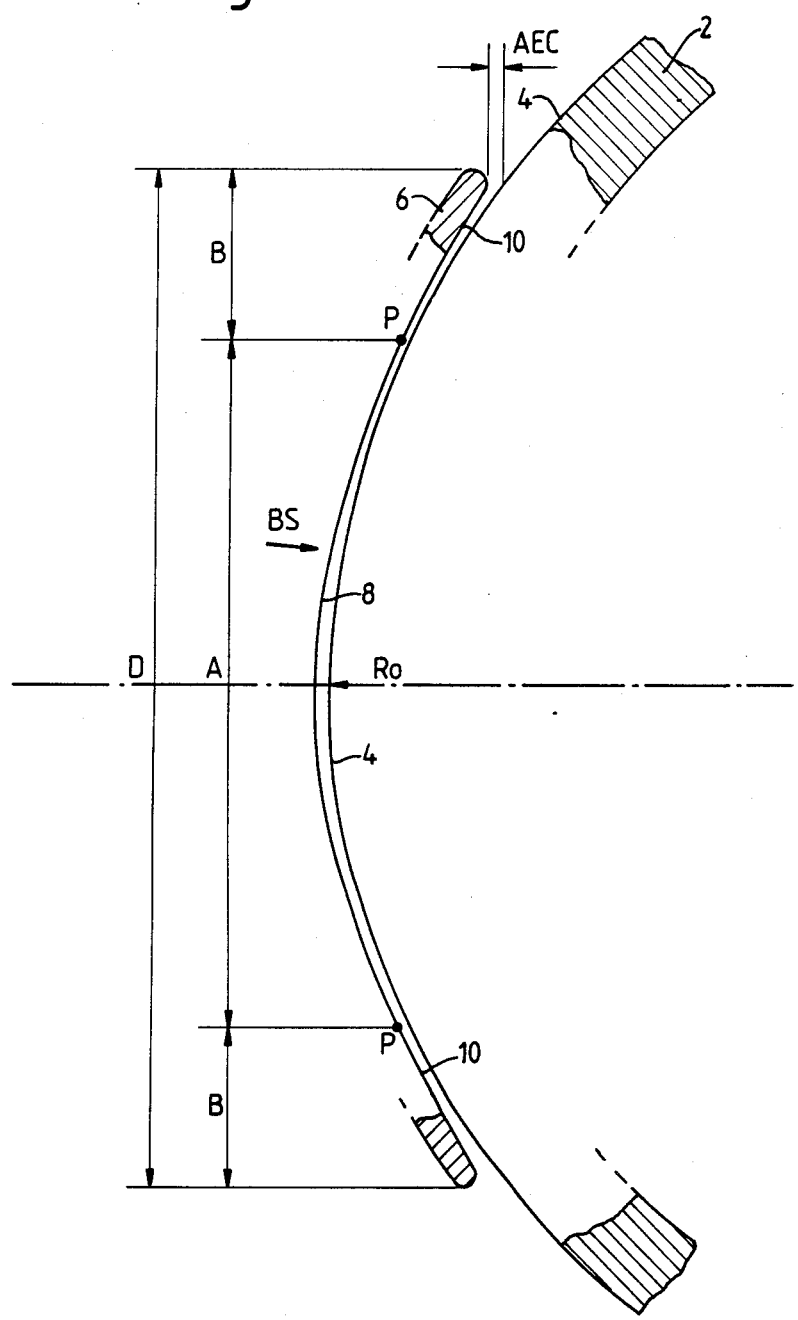
FIG. 1 is an enlarged, schematical cross section, showing the fit between the cornea and the back surface of the contact lens.

Referring now to the drawings, there is seen in FIG. 1 a quasi-cross-sectional view of the cornea 2 with its surface 4 in relation to the contact lens 6, with its back surface BS. The cornea is a substantially true ellipsoid of rotation, the generatrix of which is an ellipse with a numerical eccentricity of $\epsilon = 0.45$ (which corresponds to the eccentricity of the average human cornea) and an average radius of curvature, at the vertex, of $R_o = 7.8$ mm. The lens back surface BS, on the other hand, comprises two distinct zones: a central zone A, and a marginal zone B. The central zone A is constituted by a segment of an ellipsoid of revolution, the generatrix of which is an ellipse 8, given by its vertex equation $$Y^2 = 2R_o X - (1 - \epsilon^2) X^2$$

(Although the commonly used vertex equation of the ellipse reads $$Y^2 = 2pX - (1 - \epsilon^2) X^2$$

where p is the parameter of the ellipse, it can be shown that $p = R_o$).

$R_o$ of the elliptical generatrix of zone A is set equal to $R_o$ of the cornea, in this case $R_o = 7.8$ mm. However, the eccentricity $\epsilon$ of the generatrix of zone A is selected to be smaller than the above-mentioned eccentricity $\epsilon = 0.45$ of the cornea and, in this example, is set at $\epsilon = 0.3$.

The marginal zone B in this example is a part of the surface of a two-sheet hyperboloid of revolution, the generating hyperbola, 10, having a radius of curvature $R_o$ which is smaller than that of the cornea, being, in this example, $R_o = 6.76$ mm. The eccentricity $\epsilon$ is 1.15.

It is a characteristic feature of the lens according to the invention that the transition from the central to the marginal zone is tangential, in other words, that point P at which the central curve 8 ends and the marginal curve 10 begins lies on a tangent T (see FIG. 2) common to both curves.

It can be seen that at point P the back surface BS and the surface 4 of the cornea 4 are at their closest distance, being separated by the lacrimal film which, at this point has a thickness of about 8 micron. From point P outward, along curve 10, the clearance between lens and cornea is seen to increase, reaching a maximum at the edge of the contact lens. This axial edge clearance AEC is essential to the attainment of the above-mentioned properties upon which compatibility depends and its effect was found to be optimal at AEC=0.02 to 0.06 mm.

Figure 2:
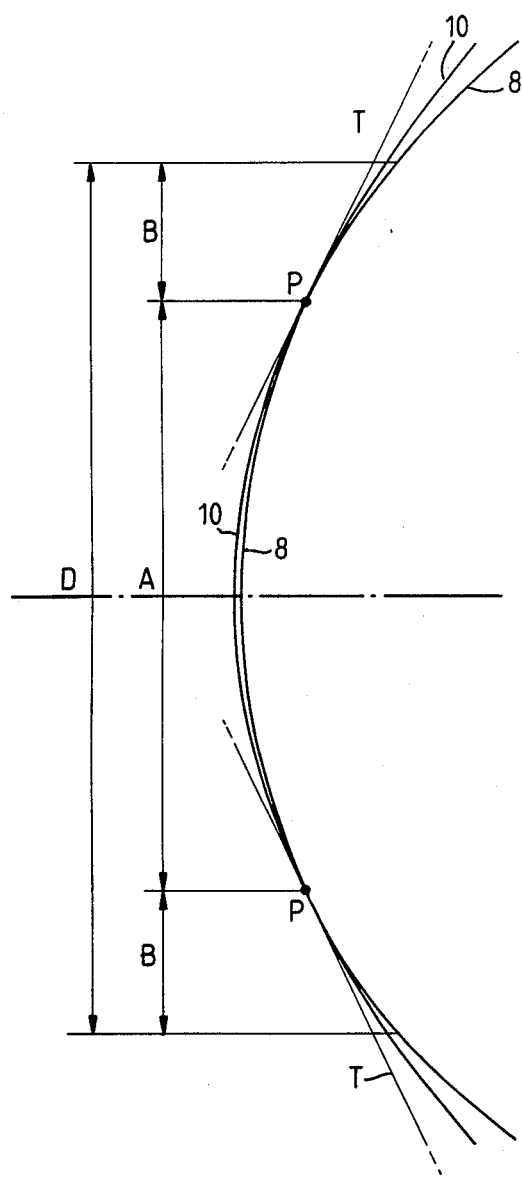
FIG. 2 illustrates the tangential transition between the central and the marginal zone of the lens back surface.

FIG. 2 illustrates the above-mentioned tangentiality condition, showing the elliptical generatrix 8 of the central zone extended, for illustrative purposes, beyond P and even beyond the outside diameter D of the lens, the hyperbolic generatrix 10 of the marginal zone B, also drawn across the central zone A to show the difference between the curves 8 and 10, the points P and the tangents T common to both curves at P.

Figure 3:
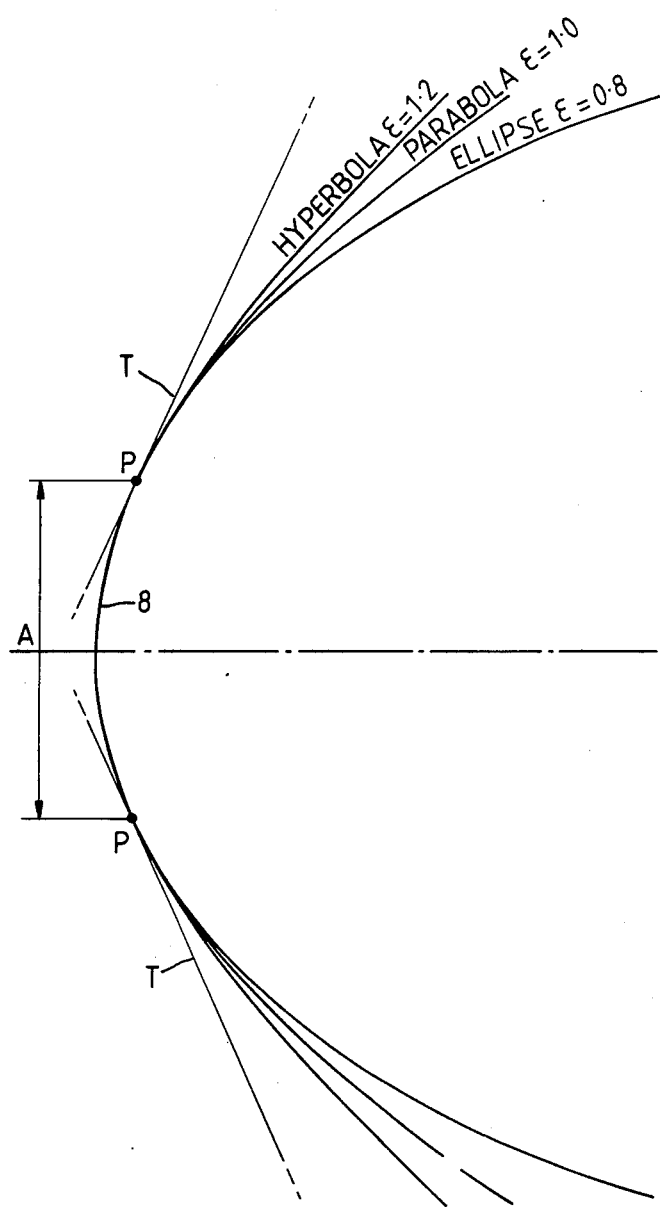
FIG. 3 represents different possibilities for the geometry of the marginal zone.

While zone B in the example of FIG. 1 was generated by a hyperbola, other conic sections (other than the circle) may be used for this purpose. FIG. 3 shows a hyperbola $R_o=6.6$ and $\epsilon=1.2$, a parabola $R_o=7.05$ and $\epsilon=1$ and an ellipse $R_o=7.35$ and $\epsilon=0.8$, all of which meet the tangency condition. The center curve is the ellipse of FIG. 1, $R_o=7.8$, $\epsilon=0.3$. Whatever curve is used for the marginal zone, $R_o<9$ mm and $\epsilon>0.55$.

Means, per se known, are available to measure the corneal $R_o$ of the prospective user, and lenses are produced from $R_o=7.0$ to $R_o=9.0$, in incremental steps of 0.2 mm, and $\epsilon<0.35$. Outside diameters D vary between 9 and 11 mm, the central zone A having a diameter of 50-75% of D.

It will be evident to those skilled in the art that the invention is not limited to the details of the foregoing illustrative embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. A contact lens having an edge; and a back surface comprising a central zone and at least one marginal zone; said central zone being constituted by a portion of a first second-order surface of revolution other than spherical; said marginal zone being constituted by a portion of a second second-order surface of revolution other than spherical, different from said first second-order surface of revolution; transition from said central to said marginal zone being tangential, and in said marginal zone, axial clearance between a cornea and the back surface increasing towards the edge of said lens.

2. The contact lens as claimed in claim 1, wherein said central zone is constituted by a portion of the surface of an ellipsoid of revolution, the elliptical generatrix of which has a numerical eccentricity smaller than that of the elliptical generatrix of the ellipsoidal surface of said cornea.

3. The contact lens as claimed in claim 1, wherein said marginal zone is constituted by a portion of a surface of revolution, the generatrix of which is a conic section other than a circle, which conic section has a numerical eccentricity larger than that of the elliptical generatrix of said cornea surface.

4. The contact lens as claimed in claim 2, wherein the differences between the eccentricities of said generatrices are selected to be such as to produce an axial edge clearance between said lens and said cornea of between 0.02 and 0.06 mm.

5. The contact lens as claimed in claim 3, wherein differences between the eccentricities of said generatrices are selected to be such as to produce an axial edge clearance between lens and said cornea of between 0.02 and 0.06 mm.

* * * * *